United States Patent

[11] 3,620,304

| [72] | Inventors | Charles L. Hearn;<br>Charles S. Holmes, both of Tulsa, Okla. |
|---|---|---|
| [21] | Appl. No. | 883,818 |
| [22] | Filed | Dec. 10, 1969 |
| [45] | Patented | Nov. 16, 1971 |
| [73] | Assignee | Cities Service Oil Company |

[54] OPTIMUM OIL RECOVERY FOR CARBON DIOXIDE INJECTION
4 Claims, 3 Drawing Figs.

| [52] | U.S. Cl. | 166/274 |
|---|---|---|
| [51] | Int. Cl. | E21b 43/22 |
| [50] | Field of Search | 166/268, 273–275, 305 |

[56] References Cited
UNITED STATES PATENTS

| 2,623,596 | 12/1952 | Whorton et al. | 166/274 |
|---|---|---|---|
| 2,724,437 | 11/1955 | Whorton et al. | 166/268 |
| 3,065,790 | 11/1962 | Holm | 166/274 |
| 3,084,743 | 4/1963 | West et al. | 166/274 X |
| 3,121,461 | 2/1964 | Sharp | 166/273 |
| 3,346,046 | 10/1967 | Boston | 166/274 X |
| 3,480,081 | 11/1969 | Felsenthal et al. | 166/274 X |

*Primary Examiner*—Ian A. Calvert
*Attorney*—J. Richard Geaman

ABSTRACT: Carbon dioxide is injected into a subterranean oil reservoir to maintain a reservoir pressure between about 1 and about 250 p.s.i. above the bubble point pressure of the reservoir crude oil. Under predetermined conditions of temperature and pressure the carbon dioxide miscible gas recovery provides for an extremely efficient displacement of the reservoir crude oil. It has been found that at pressures slightly above the bubble point pressure of the reservoir fluid, the rate of solubility of the carbon dioxide in the reservoir fluid is much higher and recovery of oil is more efficient.

CHARLES L. HEARN,
CHARLES S. HOLMES, INVENTORS.

BY J. Richard Geaman

ATTORNEY.

OPTIMUM OIL RECOVERY FOR CARBON DIOXIDE INJECTION

BACKGROUND OF THE INVENTION

This invention relates to the recovery of oil from subterranean reservoirs. More particularly, it relates to the secondary recovery of oil from subterranean reservoirs by the introduction of carbon dioxide at pressures between about 1 and about 250 p.s.i. above the bubble point pressure of the reservoir crude oil to give a resulting high-sweep efficiency and low residual oil saturation in the swept reservoir and thereby improve the oil recovery from the reservoir.

There exist many reservoirs which are too deep for the secondary oil recovery technique of waterflooding to be used. This problem occurs due to the low permeability of these deep reservoirs and therefore the noninjectivity or high-injection pressures required in order to pass water through the reservoir and the resultant high lifting costs involved in producing the water-oil reservoir effluent. To conduct secondary recovery projects in these reservoirs, it has been proposed that soluble gases under high pressure be used. The solution of the gases in the oil results in a much higher recovery of oil from regions of the reservoir swept by gas than if the gas were not soluble. However, the optimum conditions under which the gas should be injected are not always clear.

The application of miscible gases, for example carbon dioxide, for the secondary recovery of oil is well know in the art of reservoir mechanics. Whorton, et al., U.S. Pat. No. 2,623,596, describes one of the more conventional methods whereby oil is produced through the injection of carbon dioxide. In Whorton the gas is injected into and passed through an oil reservoir so as to contact the residual oil left behind after primary recovery techniques and drive this oil to the production wells. Whorton also discloses the introduction of a slug of carbon dioxide. The slug may be followed or driven by injected inert fluid which causes the slug of carbon dioxide to pass through the reservoir, contact the oil contained therein, and subsequently remove to the earth's surface the oil swept from the reservoir.

The difficulties experienced by most miscible gas displacement processes are extreme mobility ratios, fluid segregation and a high quantity or volume of gas required per barrel of oil produced. Normally, in order to create a miscible system with the reservoir oil, it is necessary to provide pressures sufficient to allow the gas and crude oil to become miscible. These extreme pressures will require an enormous volume of gas at standard conditions to be compressed and injected into the reservoir undergoing miscible displacement. The large quantities of gas required are necessarily the economic criteria by which the success or failure upon which any miscible gas drive is based. Therefore, any process which requires lower injection pressures and thereby less volume of gas per barrel of reservoir oil contacted, while yielding the same or better recovery from the swept reservoir, is an optimal condition to be sought. Also, if the channeling of the viscous materials and extreme density variations may be contended with at lower pressures a more desirable miscible displacement process is also obtained.

Numerous references disclose the injection of carbon dioxide for the improved recovery of oil, but none explicitly define a method by which the optimal recovery of oil at a given temperature and pressure may be derived. It is essential in the utilization of miscible gases such as carbon dioxide for the displacement of crude oil, to determine what conditions of injection pressure should be used in order to optimally produce the oil from the reservoir and leave the lowest saturation of residual oil behind the swept reservoir area and also yield the maximum barrels of oil per volume of gas injected.

It is an object of this invention to provide for an improved method for the miscible displacement of oil from subterranean reservoirs.

It is another object of this invention to provide for a method by which the optimal conditions for miscible displacement of reservoir oil by carbon dioxide may be determined.

It is still another object of this invention to provide for a method by which the optimal conditions for a miscible displacement drive of reservoir crude oil utilizing carbon dioxide may be determined from basic laboratory experimental data.

It is still a further object of the present invention to utilize the unique phase behavior and physical properties of carbon dioxide with reservoir crude oils under specific conditions of temperature and pressure to enhance miscible displacement of oil from subterranean reservoirs.

With these and other objects in mind, the present invention is hereinafter set forth with reference to the following description and drawings.

SUMMARY OF THE INVENTION

The objects of the present invention are accomplished by a miscible displacement process for the recovery of oil of the type wherein carbon dioxide is introduced into a subterranean oil reservoir under pressure so as to form a bank of gas which dissolves in and renders mobile the oil contained therein. The bank of carbon dioxide drives the contacted oil to a point where it is removed to the earth's surface. The improvement of this miscible displacement process comprises introducing the carbon dioxide at a pressure which will maintain the reservoir pressure between about 1 and about 250 p.s.i. above the bubble point pressure of the reservoir crude oil contained within the reservoir and producing that reservoir crude oil which is contacted by the carbon dioxide. A miscible displacement process of the present invention comprises the introduction of carbon dioxide into a reservoir which has a temperature of less than 200° F. for optimum recovery of the crude oil contained therein. The miscible displacement process may further comprise introducing inert fluid after a slug of carbon dioxide has been formed, and driving the carbon dioxide slug through the reservoir by the inert fluid. It has been found that the optimum recovery pressure in the use of carbon dioxide as a miscible driving fluid is always at a point slightly above the bubble point of the crude oil for maximum recovery and gas compression requirements. Carbon dioxide should generally then by an effective miscible displacement fluid for those reservoirs at which the pressure of the reservoir is maintained slightly above the bubble point of the crude oil contained therein.

BRIEF DESCRIPTION OF THE DRAWINGS

The present invention is hereinafter described in further detail with particular reference to the accompanying drawings in which.

DETAILED DESCRIPTION OF THE INVENTION

In a miscible displacement process, the miscible displacing fluid is generally introduced at as high an injection pressure as possible so as to maintain a high reservoir pressure to render the miscible fluid more soluble in the reservoir fluid. Where miscible gases are utilized, however, it is not only a necessary criterion to maintain maximum solubility of the gas in the oil, so as to reduce the viscosity of the oil, but also to use the least standard volume of gas to displace the reservoir fluid. Therefore, an optimum must be found between the oil recovery due to displacement of the more mobile reservoir fluid which has been contacted and dissolved by the miscible gas, and the volume of miscible gas required to displace this less viscous and therefore more mobile reservoir fluid.

The vast number of gases available and the multitude of possible injection pressures make it difficult to determine the optimum conditions and fluid for an effective high-pressure soluble gas drive. Generally, it is believed that the higher the pressure of the gas drive the higher the oil recover. Therefore, one need merely conduct experimental studies and a production analysis to obtain the optimum point of operation. We have found, however, that carbon dioxide represents a miscible drive fluid which gives unexpected recovery characteristics. That is, the actual recovery of oil versus pressure for any given crude oil-carbon dioxide system is not necessarily a linear function of pressure. The recovery, however, may be found to have optimal points other than at the high pressures.

In order to more fully understand the present invention, the following example is presented:

EXAMPLE

Figure 1:
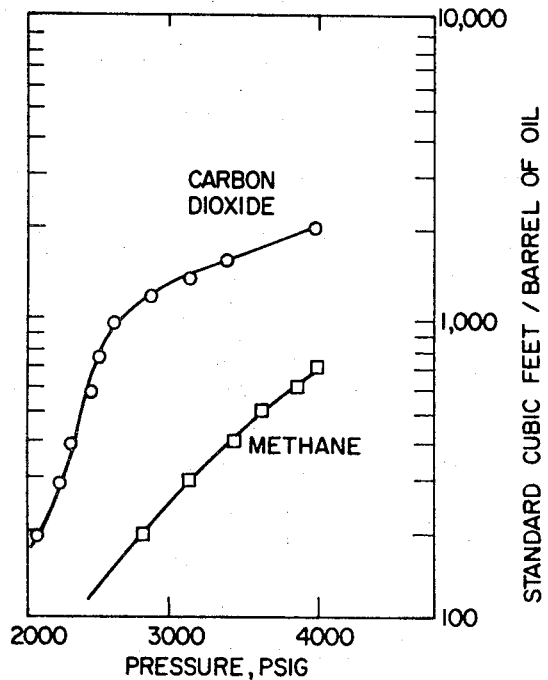
FIG. 1 represents the solubility of carbon dioxide and methane respectively in a 2,250 p.s.i.g. bubble point pressure reservoir fluid at 194° F.

The mutual solubility of several miscible gases with oil may be exhibited by many physical measurements. In the present example, carbon dioxide and methane under pressure were individually introduced into reservoir fluid having a bubble point pressure of 2,250 p.s.i.g. FIG. 1 depicts the solubility of carbon dioxide and methane at 194° F. in the 2,250 p.s.i.g. bubble point pressure reservoir fluid. It was found that carbon dioxide under pressure has an extremely high solubility in reservoir fluids, which is undoubtedly quite important in its role as a miscible displacement fluid. It is apparent from FIG. 1, that at a pressure slightly above the bubble point pressure of the reservoir fluid the rate of solubility is much higher for carbon dioxide than for methane. By "bubble point pressure," herein, is meant that of natural gas.

Figure 2:
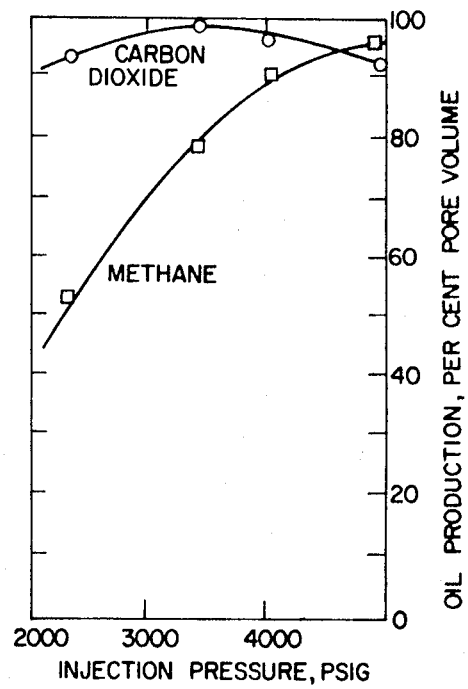
FIG. 2 represents the oil recovery obtained by use of carbon dioxide and methane respectively as displacement fluids at various pressures in the displacement of a 2,250 p.s.i.g. bubble point pressure oil at 194° F.

To further show the effectiveness of carbon dioxide as a displacing fluid, the ultimate recovery of oil obtained experimentally form a 42-foot long tubular sand pack having a 35 percent void space was determined. FIG. 2 exhibits the oil recovery by the use of carbon dioxide and methane as displacement fluids at a temperature of 194° F. in conjunction with a 2,250 p.s.i.g. bubble point pressure oil. By the present experimental procedure, the 42 foot, ¼inch O.D. stainless steel tubing sand pack was charged with 2,250 p.s.i.g. bubble point pressure oil and subsequently driven by the miscible gas, either carbon dioxide or methane, at a constant pressure and the resulting gas-oil ratios at the producing end of the sand pack tube and oil production were measured. FIG. 2 represents the ultimate recovery of oil at a gas-oil ratio of 22,000 standard cubic feet per barrel of oil produced from the tubular sand pack. It can be observed from FIG. 2 that the ultimate oil recovery for carbon dioxide is extremely high and remains fairly constant for injection pressures from slightly above the bubble point of the crude oil upwards to 5,000 p.s.i.g., whereas, in comparison when using methane as the miscible driving fluid it exhibits an ever increasing ultimate oil recovery for an ever increasing injection pressure which is typical of the linear relationship of oil recovery with injection pressure experienced in the use of most miscible displacement fluids.

Figure 3:
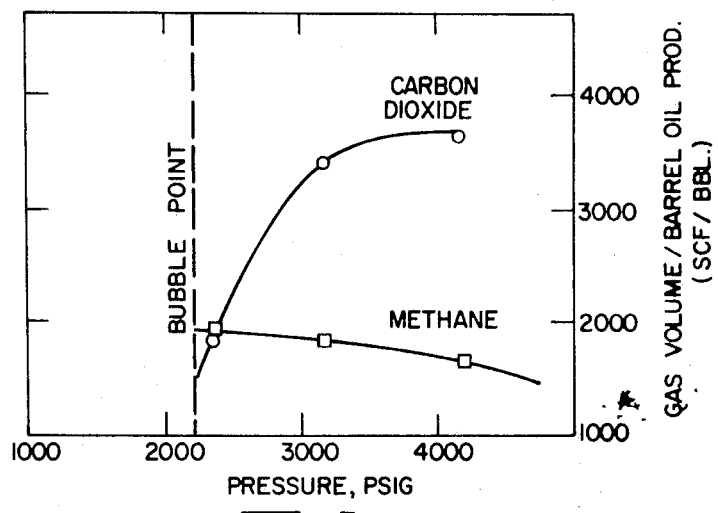
FIG. 3 represents the volume of gas required as measured at standard conditions of pressure and temperature per barrel of oil recovered by miscible displacement utilizing carbon dioxide and methane respectively.

A convenient measure of the effectiveness of a soluble gas to be used in a high-pressure gas drive is to determine the volume of gas required as measured at standard conditions of pressure and temperature per barrel of oil recovered. FIG. 3 presents this measurement as derived from experimental laboratory data for individual studies of carbon dioxide and methane displacement of the 2,250 p.s.i.g. bubble point pressure oil used in the previous study of ultimate recovery of oil at various pressures. From examination of FIG. 3, it is seen that a methane gas drive would appear to be more efficient than a carbon dioxide gas drive at pressures greater than several hundred p.s.i. above the bubble point pressure of the oil and also more optimal with increasing pressure above the bubble point of the oil. FIG. 3 does, however, show that carbon dioxide exhibits better recovery of oil per volume of gas injected at pressures slightly above the reservoir oil bubble point pressure. It is also noted that the carbon dioxide gas drive requires a lesser amount of gas per barrel of oil recovered than methane at those points slightly above the bubble point of the crude oil. Therefore, it may be concluded that the optimum recovery pressure using methane as a driving fluid would be determined by an economic balance between the volume of gas required and the compressor horsepower required to deliver that gas volume. This would be the normal procedure for calculating the pressure at which a miscible gas drive should be maintained for a given reservoir. However, it has been found that the optimum recovery pressure for carbon dioxide gas drive will always be a point slightly above the bubble point pressure of the crude oil as this is the optimum for both recovery and the compressor pressure requirements. When the efficiencies of the two soluble gas drives are considered, one finds the carbon dioxide drive to be convincingly more feasible than methane at these lower pressures. In contrast to the behavior of methane, the production optimum for carbon dioxide is always at or slightly above the bubble point pressure of the oil to be displaced. This phenomenon indicates the carbon dioxide should always be the better driving fluid for those reservoirs which have pressures slightly above the bubble point pressure of the reservoir fluid contained therein.

The exact reservoir pressure for a miscible displacement gas drive must be determined for each individual reservoir fluid to be displaced. The typical laboratory procedure used to determine the exact reservoir pressure for the miscible gas drive may be by use of a visual vapor-liquid equilibrium cell determination of the bubble point of the crude oil accompanied by a miscible displacement experimental study of the type mentioned in the above example. Laboratory studies have shown the conditions for optimal carbon dioxide gas drives, as described in the present process, to exist at temperatures up to about 200° F. Above these temperatures, a sharp trend exhibited near the bubble point begins to decrease and to yield less optimal operating conditions. Therefore, it is a preferred embodiment of the present invention to operate miscible gas displacement with carbon dioxide at pressures between about 1 and about 250 p.s.i. above the bubble point pressure of the reservoir crude oil and at reservoir temperatures up to but not exceeding about 200° F.

The process disclosed herein may be specifically modified for use in slug-type application. By this procedure, a predetermined amount of miscible gas is introduced into the dioxide The reservoir is maintained at a pressure between about 1 and about 250 p.s.i. above the bubble point pressure of the crude oil contained therein. The slug of miscible material or carbon dioxide is then driven through the reservoir by subsequent injection of an inert fluid. Any of the many inert fluids capable of driving a slug of the carbon dioxide may be used. Typical driving fluids consist of nitrogen, air, flue gas and water. These driving fluids may be used in conjunction with a slug of carbon dioxide or may be mixed therewith the carbon dioxide to driving fluid. The slug mechanism aids in oil recovery and is efficient in that only that amount of carbon dioxide required to dissolve in, swell, and render mobile the residual oil left behind after primary or other secondary oil production need be provided, and that gas generally used as a driving medium behind the carbon dioxide front is thereby replaced by a cheaper and more readily obtained driving fluid, such as those mentioned above. Therefore, the process is made more economic and renders the process more readily useable in areas which are carbon dioxide deficient and where carbon dioxide must be brought in from exterior areas.

The present invention, therefore, provides a highly significant method for the recovery of oil from subterranean reservoirs. The improved miscible displacement process is applicable to reservoirs previously determined to be unsuitable for secondary oil recovery by miscible gas displacement. The recovery of oil from reservoirs abandoned after primary production or rejected for miscible injection are rendered suitable by this process so that the total oil recovery therefrom is enhanced. In addition, since an optimum quantity of carbon dioxide is utilized in the miscible gas displacement process one may obtain the most efficient operating conditions with a maximum quantity of oil recovered. This phenomenon results both from the physical characteristics of the carbon dioxide gas itself and the inherent nature of the increased solubility and mobility relationships which are exhibited by the carbon dioxide miscible gas drive. It is, therefore, noted that the carbon dioxide gas drive requires a lesser amount of gas per barrel of oil recovered than common displacing gases and exhibits an unexpected optimal physical range in which miscible gas displacement with carbon dioxide should be utilized.

The invention has been described herein with reference to particular embodiments and aspects thereof. It will be appreciated by those skilled in the art that various changes and modifications can be made, however, without departing from the scope of the invention.

Therefore, we claim:

1. In a miscible displacement process for the recovery of oil of the type wherein carbon dioxide is introduced into one or more injection wells into a subterranean oil reservoir under pressure so as to form a bank of gas which dissolves and renders mobile the oil contained therein and drives the contacted oil to a point where it is removed to the earth's surface through one or more production wells, the improvement which comprises introducing the carbon dioxide at a pressure which will maintain the reservoir and fluids contained therein at a pressure between about 1 and about 250 p.s.i. above the bubble point pressure of the reservoir crude oil.

2. The process of claim 1 further comprising the introduction of the carbon dioxide into a reservoir which has a temperature less than about 200° F.

3. The process of claim 1 further comprising:
    a. introducing an inert fluid after a slug of carbon dioxide has been formed; and
    b. driving the carbon dioxide slug through the reservoir with the inert fluid.

4. The process of claim 3 further comprising the introduction of the carbon dioxide slug and inert fluid into a reservoir which has a temperature less than about 200° F.

* * * * *